2 Sheets--Sheet 1.

A. B. ALLEN.

Mowing-Machine.

No. 6,332.

Reissued March 16, 1875.

*A. B. Allen*

*INVENTOR*

*WITNESSES*

*H. H. Young*

*F. Stith*

*By his Attorney*

*Wm. Baldwin*

2 Sheets--Sheet 2.

A. B. ALLEN.

Mowing-Machine.

No. 6,332.

Reissued March 16, 1875.

A. B. Allen

INVENTOR

WITNESSES

H. H. Young

F. Stith

By his Attorney

Wm D. Baldwin

UNITED STATES PATENT OFFICE

ANTHONY B. ALLEN, OF TOM'S RIVER, NEW JERSEY, ASSIGNOR, BY MESNE ASSIGNMENTS, TO RUFUS DUTTON AND RICHARD H. ALLEN.

IMPROVEMENT IN MOWING-MACHINES.

Specification forming part of Letters Patent No. 29,228, dated July 24, 1860; extended seven years; reissue No. 6,132, dated March 16, 1875; application filed February 10, 1875.

*To all whom it may concern:*

Be it known that I, ANTHONY B. ALLEN, formerly of the city, county, and State of New York, but now residing at Tom's River, Ocean county, New Jersey, have invented certain new and useful Improvements in Mowing-Machines, of which the following is a specification:

My invention relates to mowing-machines of that type in which a finger-beam projects laterally from one side of a main frame, to which it is so hinged as to be free to conform to irregularities of the surface over which it glides.

The subject-matter claimed is hereinafter particularized.

Figure 1:
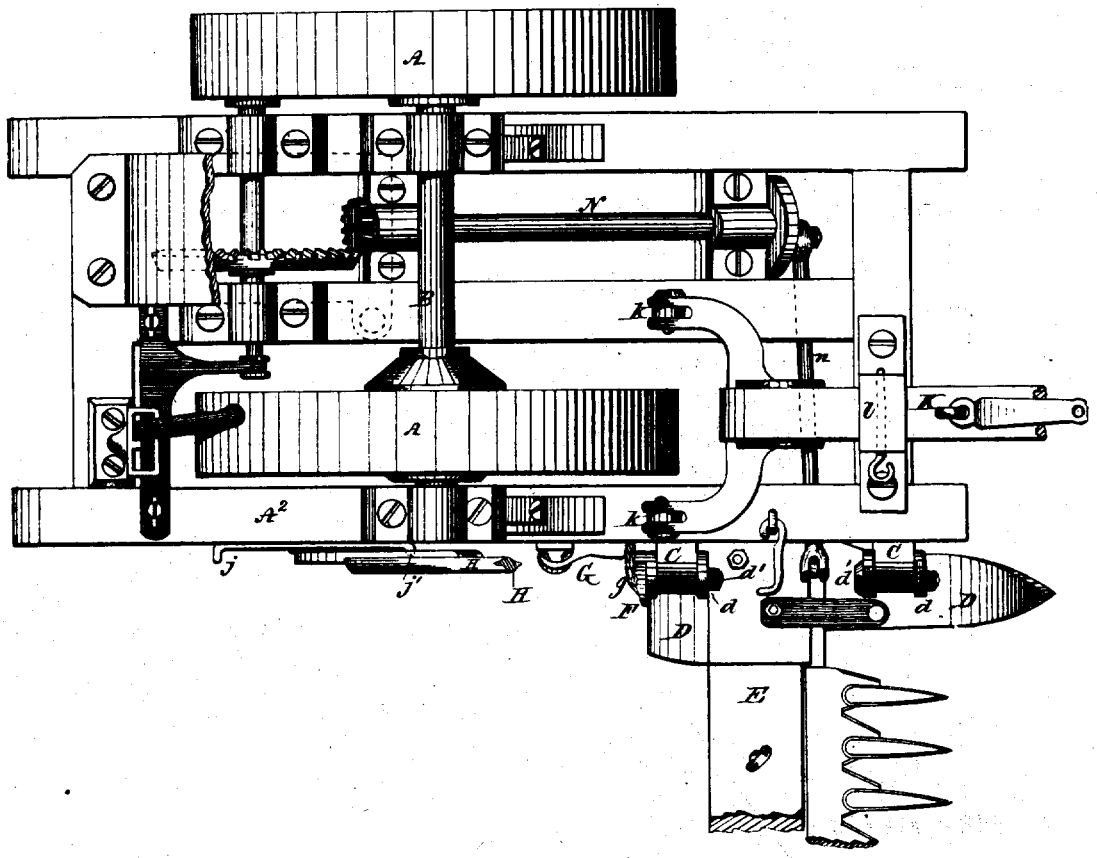
Figure 2:
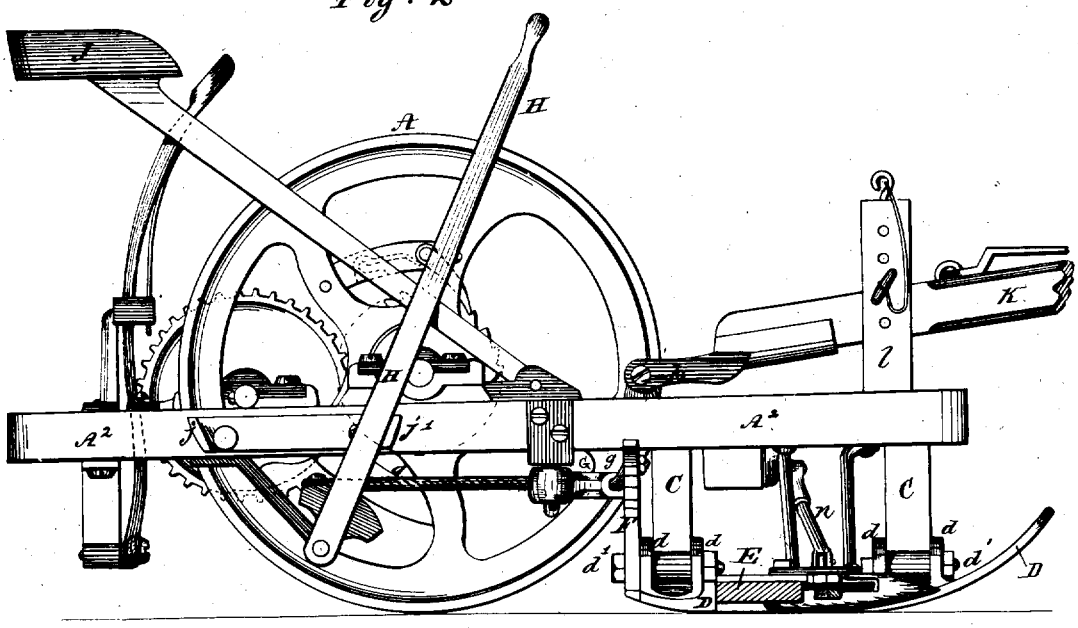

In the accompanying drawings, Figure 1 represents a plan view of a mowing-machine embracing my improvements; Fig. 2, a side elevation thereof, with the cutting apparatus in section; and Fig. 3, a view showing certain details of the mechanism.

It is deemed unnecessary here to do more than refer to the ordinary parts of a mower, the details of their construction being well known to skillful builders.

Two driving-wheels, A $A^1$, are mounted on an axle, B, supporting a main frame, $A^2$. Two arms or down-hangers, C C, are attached to and project beneath the frame, and slightly beyond its side. A shoe, D, is pivoted to these down-hangers by means of lugs *d* and bolts *d'*. The finger-beam E is secured to this shoe, as usual. A locking-lever, F, is pivoted on the bolt of the shoe so as to rock freely, being curved outward at its upper end to give considerable play without interfering with the frame. (See Fig. 3.) A stop, *e*, on the shoe limits the movement of this locking-lever in the direction of the main frame, while leaving it free to move in the opposite direction. A cord or chain, *g*, secured to this locking-lever, passes over a grooved sector, G, pivoted to the main frame, and is secured to a hand-lever, H, likewise pivoted to the main frame, and extending upward so as to be within easy reach of the driver when on his seat J. The range of movement of the lever is limited by suitable stops *j j'*. The driver's seat, being behind the axle, serves to counterbalance the weight of the cutting apparatus.

The tongue K is pivoted at *k* to the main frame, so that each may play freely up and down, when desired, and they may be locked together, when desired, by a strap, *l*, through which a pin passes.

The crank-shaft N is driven by gearing, as usual. Its pitman *n* passes underneath the frame and between the down-hangers. The shoe and hangers carry the front end of the frame high enough above the ground to leave room for the pitman beneath the frame, which is important in this class of machines.

Figure 3:
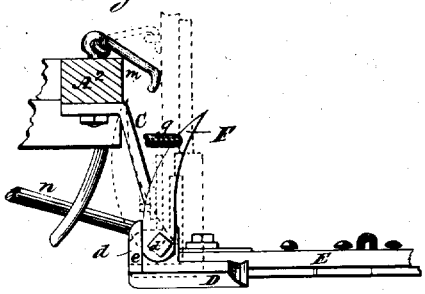

By the construction above described the outer or divider end of the finger-beam will be raised when the lever H is drawn backward, so that the driver can reach the track-clearer and draw the finger-beam up against the main frame, as shown in Fig. 3, where it is held by a hook, *m*.

The inner end of the finger-beam can be set higher or lower by inserting the pin in different holes in the strap *l*; and as this pin is above the tongue the finger-beam is free to rise, although prevented from descending beyond the point at which the stop is set.

The locking-lever allows the divider end of the finger-beam freely to rise on its hinge, while limiting its downward movement when desired.

I claim as my invention—

1. A locking-lever pivoted on the shoe of a mowing-machine, substantially in the manner described, so as to yield as the finger-beam is folded up to the main frame.

2. The combination of a finger-beam, a hinged shoe, a locking-lever pivoted on the shoe, and a stop also mounted thereon, these members being constructed and operating in combination, substantially in the manner described.

3. The combination of a finger-beam, a hinged shoe, a lever pivoted thereon, a stop against which the lever abuts, a lifting-lever on the main frame, and a chain connecting the lifting-lever and locking-lever, these members being constructed and operating in combination, substantially as set forth, whereby the locking-lever is first locked partially to lift the divider end of the finger-beam, and then yields to allow the finger-beam to be folded up to the main frame.

ANTHONY B. ALLEN.

Witnesses:

WM. I. JAMES,

B. H. MORSE.